(12) United States Patent
Cooper et al.

(10) Patent No.: US 7,000,046 B1
(45) Date of Patent: Feb. 14, 2006

(54) STANDARD CHANNEL I/O PROCESSOR (SCIOP)

(75) Inventors: Thomas P. Cooper, New Brighton, MN (US); Carl R. Crandall, Hugo, MN (US); Thomas N. DeVries, Apple Valley, MN (US); Michael J. Heideman, New Brighton, MN (US); Craig B. Johnson, Shoreview, MN (US); David A. Novak, Coon Rapids, MN (US); Michael C. Otto, Stillwater, MN (US); Haeng D. Park, St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 322 days.

(21) Appl. No.: 10/346,459

(22) Filed: Jan. 17, 2003

(51) Int. Cl.
*G06F 13/00* (2006.01)
*G06F 15/16* (2006.01)

(52) U.S. Cl. .................. 710/200; 710/110; 709/210

(58) Field of Classification Search .............. 710/15, 710/52, 100, 113, 200; 707/8, 10, 202; 711/152, 711/153, 147, 141, 162, 145; 714/6, 15; 709/226, 223; 718/107; 370/252
See application file for complete search history.

(56) References Cited

U.S. PATENT DOCUMENTS

| | | | | |
|---|---|---|---|---|
| 4,754,398 A * | 6/1988 | Pribnow | .................. | 709/226 |
| 5,067,071 A * | 11/1991 | Schanin et al. | ............. | 710/113 |
| 5,239,644 A * | 8/1993 | Seki et al. | .................... | 710/52 |
| 5,673,384 A * | 9/1997 | Hepner et al. | ................. | 714/6 |
| 5,758,149 A * | 5/1998 | Bierma et al. | ................. | 707/8 |
| 5,809,543 A * | 9/1998 | Byers et al. | ................ | 711/162 |
| 5,913,227 A * | 6/1999 | Raz et al. | ................... | 711/152 |
| 5,940,826 A * | 8/1999 | Heideman et al. | ............ | 707/8 |
| 5,949,970 A * | 9/1999 | Sipple et al. | ................. | 714/15 |
| 6,014,669 A * | 1/2000 | Slaughter et al. | ............ | 707/10 |
| 6,029,190 A * | 2/2000 | Oliver | ....................... | 718/107 |
| 6,161,198 A * | 12/2000 | Hill et al. | ..................... | 714/15 |
| 6,314,501 B1 * | 11/2001 | Gulick et al. | ............... | 711/153 |
| 6,336,171 B1 * | 1/2002 | Coskrey, IV | ................ | 711/152 |
| 6,449,734 B1 * | 9/2002 | Shrivastava et al. | .......... | 714/15 |
| 6,490,585 B1 * | 12/2002 | Hanson et al. | ................ | 707/10 |
| 6,510,496 B1 * | 1/2003 | Tarui et al. | .................. | 711/147 |
| 6,523,078 B1 * | 2/2003 | Desai | ......................... | 710/200 |
| 6,591,348 B1 * | 7/2003 | Deshpande et al. | ......... | 711/141 |
| 6,701,330 B1 * | 3/2004 | Cooper et al. | ............. | 707/202 |
| 2002/0199045 A1 * | 12/2002 | Browning et al. | ......... | 710/100 |
| 2003/0023780 A1 * | 1/2003 | Husted et al. | ................ | 710/15 |

* cited by examiner

*Primary Examiner*—Rehana Perveen
*Assistant Examiner*—Christopher E. Lee
(74) *Attorney, Agent, or Firm*—Charles A. Johnson; Mark T. Starr; Nawrocki, Rooney & Silvertson, P.A.

(57) ABSTRACT

An apparatus for and method of implementing a cluster lock processing system having a relatively large number of commodity cluster instruction processors which are managed by a highly scalable, off the shelf communication processor. Because the commodity processors have virtually no system viability features such as memory protection, failure recovery, etc., the communication processor assumes the responsibility for providing these functions. The low cost of the commodity cluster instruction processors makes the system almost linearly scalable. Furthermore, having a fully scalable communication processor ensures a completely scalable system. The cluster/locking, caching, and mass storage accessing functions are fully integrated into a single hardware platform.

18 Claims, 15 Drawing Sheets

| #DWORDs | # Bytes | Data Structure Definition |
|---|---|---|
| 32,768 | 131,072 | Segment Descriptor Pointer Table |
| 15,384 | 65,536 | Segment Descriptors |
| 4,194,304 | 16,777,216 | Segment Data |
| 131,072 | 524,288 | Process Index Table |
| 2,097,152 | 8,388,608 | Lock Index Table |
| 262,144 | 1,048,576 | Sub-Application Table |
| 2,097,152 | 8,388,608 | Validity Index Table |
| 16 | 64 | Recovery In Progress Table |
| 64 | 256 | Message Control Table |
| 71,680 | 286,720 | Head-of-Host Table (w/o message buffers) |
| 8,388,608 | 33,554,432 | Message Buffers |

FIG. 8

STANDARD CHANNEL I/O PROCESSOR (SCIOP)

CROSS REFERENCE TO CO-PENDING APPLICATIONS

U.S. patent application Ser. No. 10/346,392, filed Jan. 17, 2003, and entitled, "Outboard Clustered Computer Systems Manager Utilizing Commodity Components"; U.S. patent application Ser. No. 10/346,458, filed Jan. 17, 2003 and entitled, "Ability to Support Non-Proprietary Locking Protocols"; U.S. patent application Ser. No. 10/346,301, filed Jan. 17, 2003, and entitled, "Support for Two-Phase Commit in Multi-Host Systems"; U.S. Patent Application No. 10/346,696, filed Jan. 17, 2003, and entitled, "Software Control Using the Controller as a Component to Achieve Disaster Resiliency in a Computer System Utilizing Separate Servers for Redundancy"; U.S. patent application Ser. No. 10/346,390, filed Jan. 17, 2003, and entitled, "A Method for Generating a Unique Identifier and Verifying a Software License in a Computer System Utilizing Separate Server for Redundancy"; U.S. patent application Ser. No. 10/346,933, filed Jan. 17, 2003, and entitled, "A Clustered Computer System Utilizing Separate Servers for Redundancy in Which the Host Computers are Unaware of the Usage of Separate Servers"; U.S. patent application Ser. No. 10/346,489, filed Jan. 17, 2003 and entitled, "A Method for Allowing a Clustered Computer Systems Manger to Use Disparate Hardware on Each of the Separate Servers Utilized for Redundancy"; U.S. patent application Ser. No. 10/347,009, filed Jan. 17, 2003, and entitled, "A Method for Shortening the Resynchronization Time Following Failure in a Computer System Utilizing Separate Servers for Redundancy"; U.S. patent application Ser. No. 10/346,456, filed Jan. 17, 2003, and entitled, "A Method for Obtaining Higher Concurrency and Allowing a Larger Number of Validity Objects in a Computer System Utilizing a Clustered Systems Manager"; and U.S. patent application Ser. No. 10/346,411, filed Jan. 17, 2003, and entitled, "A Method for Distributing the Processing Among Multiple Synchronization Paths in a Computer System Utilizing Separate Servers for Redundancy" are commonly assigned co-pending applications incorporated herein by reference.

BACKGROUND OF THE INVENTION

1. Field of the Invention

The present invention generally relates to data processing systems and more particularly relates to data processing system architectures which employ a relatively large number of clustered instruction processors having internal input/output capability.

2. Description of the Prior Art

It is known in the prior art to increase the computational capacity of a data processing system through enhancements to an instruction processor. It is also known that enhancements to instruction processors become extremely costly to design and implement. Because such enhancements tend to render the resulting system special purpose in nature, the quantities of such enhanced processors needed within the market place is quite small, thus tending to further increase per unit costs.

An early approach to solving this problem was the "super-computer" architecture of the 60's, 70's, and 80's. Using this technique, a single (or small number of) very large capacity instruction processor(s) is surrounded by a relatively large number of peripheral processors. The large capacity instruction processor is more fully utilized through the work of the peripheral processors which queue tasks and data and prepare needed output. In this way, the large capacity instruction processor does not waste its time doing the more mundane input/output and conversion tasks.

This approach was found to have numerous problems. Reliability tended to rest solely on the reliability of the large capacity instruction processor, because the peripheral processors could not provide efficient processing anything without it. On the other hand, at least some of the peripheral processors are needed to provide the large capacity instruction processor with its only input/output interfaces. The super computer approach is also very costly, because performance rests of the ability to design and build the uniquely large capacity instruction processor.

An alternative to increasing computational capacity is the employment of a plurality of instruction processors into the same operational system. This approach has the advantage of generally increasing the number of instruction processors in the market place, thereby increasing utilization volumes. It is further advantageous that such an approach tends to utilize redundant components, so that greater reliability can be achieved through appropriate coupling of components.

However, it is extremely difficult to create architectures which employ a relatively large number of instruction processors. Typical problems involve: non-parallel problems which cannot be divided amongst multiple instruction processors; horrendous management problems which can actually slow throughput because of excessive contention for commonly used system resources; and system viability issues arising because of the large number of system components which can contribute to failures that may be propagated throughout the system. Thus, it can be seen that such a system can decrease system performance while simultaneously increasing system cost.

An effective solution is the technique known as the "cluster/lock" processing system, such as the XPC (Extended Processing Complex) available from Unisys Corporation and described in U.S. Pat. No. 5,940,826, entitled "Dual XPCs for Disaster Recovery in Multi-Host Environments", which is incorporated herein by reference. This technique utilizes a relatively large number of instruction processors which are "clustered" about various shared resources. Tasking and management tends to be decentralized with the cluster processors having shared responsibilities. Maximal redundancy is utilized to enhance reliability.

Though a substantial advance, the cluster/lock systems tend to solve the reliability problems but remains relatively costly to implement, because virtually all of the hardware and firmware are specifically designed and manufactured for the cluster/lock architecture. This is necessary to enable each of the system components to effectively contribute to system reliability, system management, and system viability As a result, demand volumes remain relatively low.

In implementing prior art modular cluster/lock systems, it is normal to separate the locking, caching, and mass storage accessing functions. This is logical because it provides maximum scalability. However, with this approach, because the cluster/lock processor cannot directly connect to the mass storage devices upon which the data base resides, the acceleration of data into the cache and deceleration back to mass storage is very time consuming, complex to design, and cumbersome to manage. As a result of this separation of the functions of I/O and cluster locking into different platforms, the architecture becomes more costly in two ways. First, each of the different kinds of platforms is required to have a full set of capabilities, because both platforms must have some I/O capability, and each must have some processing capacity. Second and perhaps most important, the connectivity becomes almost unmanageable, because each of the devices must communicate with each of the other devices. Furthermore, however the connectivity problem is solved is likely to increase system overhead, because of the need to accommodate all of the inter-platform interfaces.

SUMMARY OF THE INVENTION

The present invention overcomes the disadvantages of the prior art by providing a technique which incorporates the cluster/lock, cache, and mass storage access functions all within a single platform of the overall cluster/lock processing system. The preferred mode of the present invention is incorporated into a system with a relatively large number of low cost instruction processors providing an extremely high performance, high reliability, relatively low cost cluster/lock system. The low cost is largely achieved by utilizing "commodity" hardware and software for the large numbers of instruction processors. In this sense, a "commodity" system component is one which is designed for and marketed to the general public. For example, in the preferred mode of the present invention, each of the large number of instruction processors is essentially an industry compatible personal computer chip available from Intel Corporation, similar to that found in many "high-end" home computers. Similarly, these instruction processors employ a commonly available operating system, such as a current version of "Windows" available from Microsoft Corporation.

As is well known, these commodity components, though relatively inexpensive because of the high production volumes, do not have the reliability features found in the more specialized hardware and software typically utilized for commercial, industrial, and defense applications. In fact, most home computer users are well aware of and simply learn to live with the reliability problems well known to exist in these commodity systems. Unlike previous cluster processing systems, the approach of the present invention does not incur the expense of upgrading these commodity components, but utilizes them as they exist in the market place.

Because the commodity components employed do not meet the desired levels of reliability, etc., virtually all system management, system reliability, and system viability responsibility is assigned to a centralized entity called the "cluster lock server". This server is not specifically developed for the present system, but already exists in the market place and is currently available to commercial and industrial users. In the preferred mode of practicing the present invention, the cluster lock server is a Cellular Multiprocessing (CMP) architecture System available from Unisys Corporation. The cluster lock server are preferably employed in tandem for recovery from single point failures.

Thus during operation, a host computer utilizes the large number of commodity instruction processors (essentially personal computers) similar to the personal computer employed by users in their homes and offices. The host computer expects that there will be reliability problems with the hardware and software of each and every one of the commodity instruction processors and has available to it the means to systematically recover from those failures.

As a result of the innovative architecture of the preferred mode of the present invention, extremely large processing capacity computer systems are implemented using only off-the-shelf hardware and software with the addition of only a minimum of specialized interface software. Therefore, hardware and software costs are extremely low in view of the cluster system processing capacity. These advantages accrue as a result of an architecture which employs cluster/lock processing, large scale caching, and direct mass storage accessing within a single platform. This provides reduced cost by eliminating the requirement to have two hardware platforms (i.e., one for data base locking/caching and one to perform I/O). A second advantage of the architecture is that it reduces needed connectivity. The number of connections required to support two separate platforms is eliminated. System overhead is further reduced because it is no longer needed to accelerate/decelerate cached I/O data to provide an interface between two different platforms.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 8 is a memory allocation table for the cluster processing system;

DETAILED DESCRIPTION OF THE PREFERRED EMBODIMENTS

The present invention is described in accordance with several preferred embodiments which are to be viewed as illustrative without being limiting. These preferred embodiments are based upon mainframe hardware components and various operating system software components available from Unisys Corporation and commodity hardware and software components available from Microsoft Corporation, Intel Corporation, and in the general personal computer market place.

Figure 1:
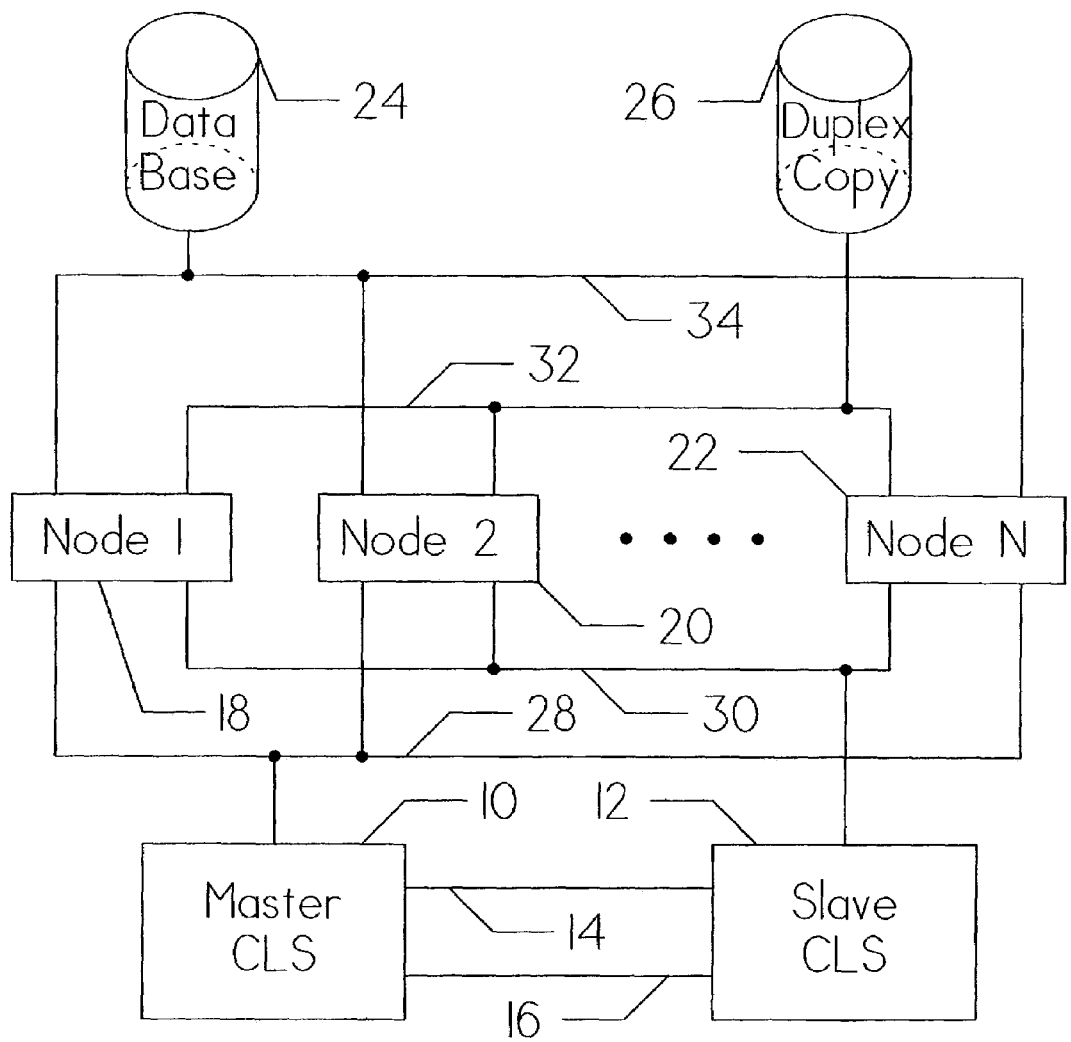
FIG. 1 is detailed block diagram showing a generalized cluster processing system in accordance with the present invention.

FIG. 1 is a detailed diagram showing the general relationship of the clustered hardware components. The commodity instruction processors Node 1 (18), Node 2 (20), and Node N (22) are preferably processor chips from industry compatible personal computers of the currently available technology. The total number of instruction processors is selected for the particular system application(s). Each of these instruction processors communicate with Data Base 24 and Duplex Copy 26 of Data Base 24 via busses 34 and 32, respectively. This provides the redundancy necessary to recover from single point of failures within the data base.

In addition to the interface with the data base and its duplicate copy, the instruction processors can communicate only with Master CLS (Cluster Lock Server) 10 and Slave CLS 12 via busses 28 and 30, respectively. Redundant connections to redundant cluster lock servers ensures that single point control structure failures can also be accommodated. Because the sole interface between the instruction processors (i.e., Nodes 1, 2, . . . N) is with the Master CLS and Slave CLS, all services to be provided to an individual instruction processor must be provided by the Master CLS or Slave CLS. The primary services provided include: 1) services to synchronize updates to one or more shared databases; 2) services to facilitate inter-node communication; 3) services to provide for shared data among the nodes; 4) services to detect failing nodes in the cluster; and 5) duplication of all information contained in the Cluster Lock Server.

Services provided for synchronization of database updates assume all nodes in the cluster use the same locking protocol. The CLS is the "keeper" of all locks for shared data. The locking functionality includes: 1) ability for any node to request and release database locks; 2) ability to support multiple locking protocols; 3) asynchronous notification to the appropriate node when a lock has been granted; 4) automatic deadlock detection including the ability to asynchronously notify the nodes owning the locks that are deadlocked; and 5) support for two-phase commit processing using XA including holding locks in the "ready" state across recoveries of individual nodes.

Inter-node communication services provide the capability for any node to send messages to and receive messages from any other node in the cluster. The ability for a node to broadcast to all other nodes is also provided.

Shared data services provide the capability for the nodes to share the common data structures required to facilitate the management and coordination of the shared processing environment. This data is maintained within the CLS.

Failed node detection services include heartbeat capability, the ability to move in-progress transactions from a failed node onto other nodes and the ability to isolate the failed node.

Although not required to practice the invention, in the preferred mode, the CLS's are duplexed in a master/slave relationship. The nodes communicate with either or the slave with each ensuring all data is duplicated in the other. The ability of a node to communicate with either the master or the slave at any time increases resiliency and availability as the loss of the physical connection from the node to either the master or the slave does not effect the nodes's ability to continue operating. The master is responsible for control and heartbeat functions. The ability to manually switch from the master to the slave is also provided in the preferred mode. Manual switching facilitates testing and maintenance. Of course, automatic switching occurs upon failure of the master CLS.

Figure 2:
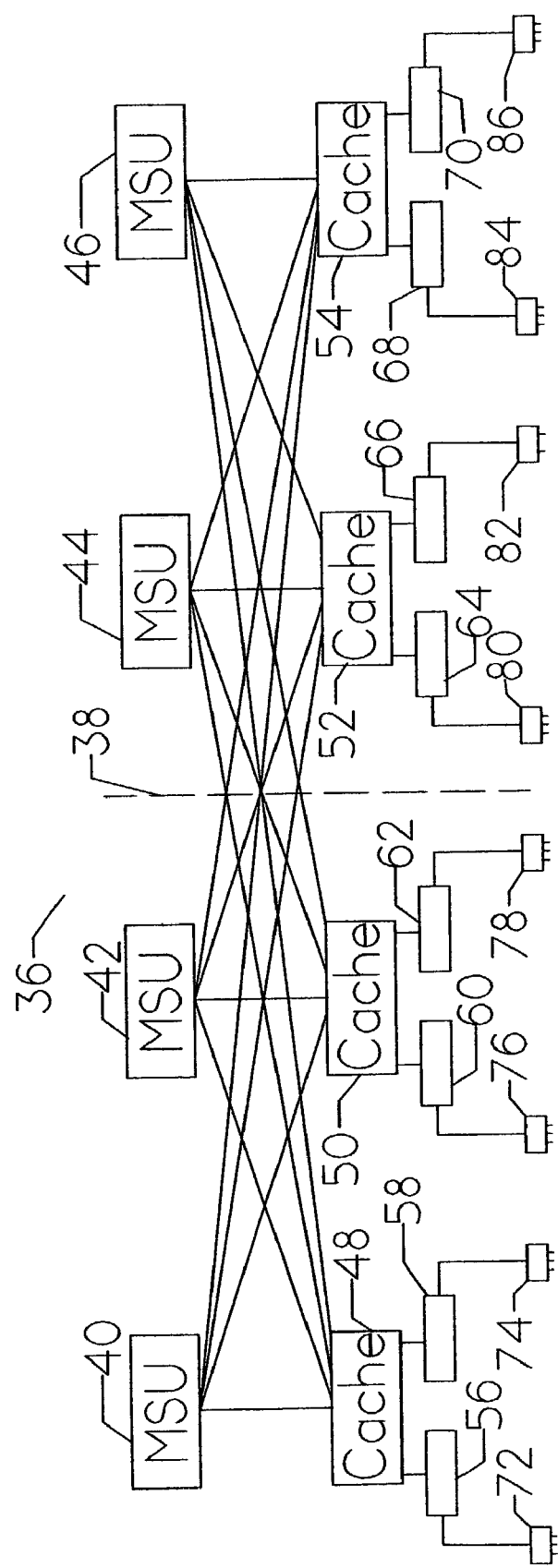
FIG. 2 is a detailed diagram showing the architecture of the cluster lock server.

FIG. 2 is a detailed block diagram 36 of a fully populated ES7000 Cellular Multi-Processor (CMP) system available from Unisys Corporation. Each of Master CLS 14 and Slave CLS 16 consists of one of these computers. The ES7000 CMP is a commercially available product available from Unisys Corporation now on the market. One key advantage of this computer is that it provides the cluster lock server with inherent scalability. It should be readily apparent that the total processing load on a cluster lock server increases directly with the number of cluster instruction processors which are directly managed by that cluster lock server. Thus, it is of substantial value that a readily scalable processor is utilized for this purpose. It is further required that the cluster lock server have the inherent reliability (e.g., failure recovery) and system viability (e.g., memory and shared resource protection) functionality to assume responsibility for these aspects of the systems operation.

A fully populated CMP contains up to four main memory storage units, MSU 40, MSU 42, MSU 44, and MSU 46. These are interfaced as shown through up to four cache memory systems, Cache 48, Cache 50, Cache 52, and Cache 54. Each of subpods 56, 58, 60, 62, 64, 66, 68, and 70 contains up to four instruction processors, each having its own dedicated cache memories. Duplexed input/output processors 72, 74, 76, 78, 80, 82, 84, and 86 interface with the cluster instruction processors (see FIG. 1), with other cluster lock server(s), and with host computers (see below). Thus, each of the cluster lock servers (i.e., Master CLS 14 and Slave CLS 16) preferably consists of an ES7000 CMP having from one to four MSU's, one to four Cache's, one to eight subpods, and one to eight duplexed input/output processors.

To further enhance reliability, and already a part of the ES7000 CMP system, various of the components are separately powered. In accordance with the fully populated system of block diagram 36, all components left of line 38 are powered by a first power source (not shown) and all components right of line 38 are powered by a second power source (not shown). In this manner, the system remains viable even during the course of a single power source failure.

Figure 3:
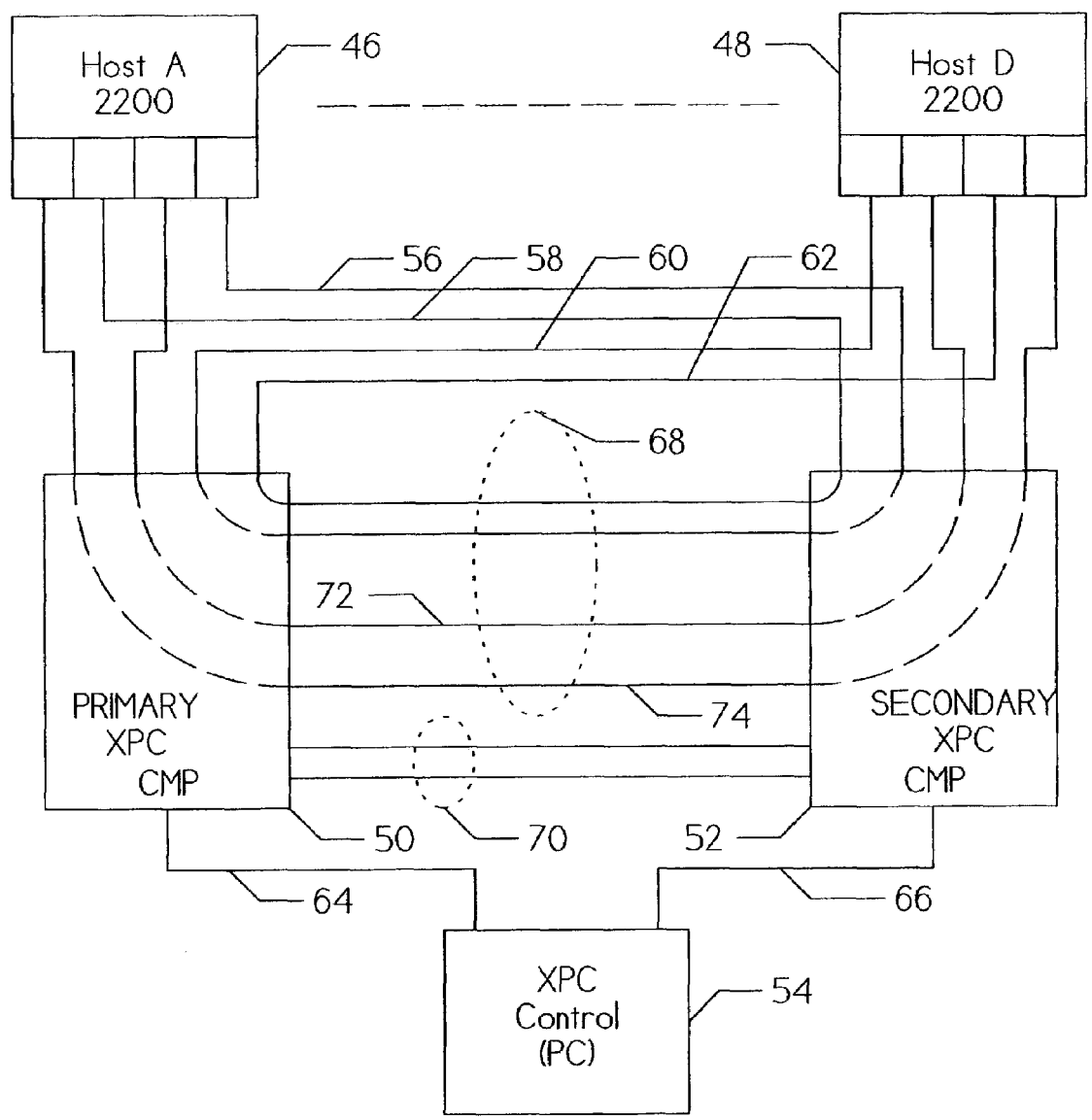
FIG. 3 is a detailed schematic diagram showing data flow paths within the overall system of the present invention.

FIG. 3 is a detailed block diagram showing implementation of the cluster processing system of the present invention within a practical configuration for high capacity and high reliability data processing. The major hardware components include Primary (or Master) Extended Processing Complex (XPC) 50 and Secondary (or Slave) XPC 52, each of consisting of a cluster processing system as discussed above. As noted in the diagram, each of the cluster processing systems (i.e., XPC 50 and XPC 52) interfaces through a CMP as shown. The actual cluster instruction processors (i.e., Nodes 1–N) are not separately shown except through their interface with the XPC's. XPC control 54 is a personal computer implemented as control console which interfaces with the XPC's via intercomputer paths 64 and 66.

The "external world" is shown as Host A 46 through Host D 48, which are coupled to the XPC's via intercomputer paths 56, 58, 60, and 62. The host computers are preferably Clearpath Plus (2200 based) mainframe computers available from Unisys Corporation. The paths are arranged to provide completely redundant paths amongst all major components. Paths 68 are the Primary/Secondary crossover paths wherein paths 72 and 74 are redundant request/status packet routing paths. Paths 70 are the Primary/Secondary synchronization paths.

Figure 4:
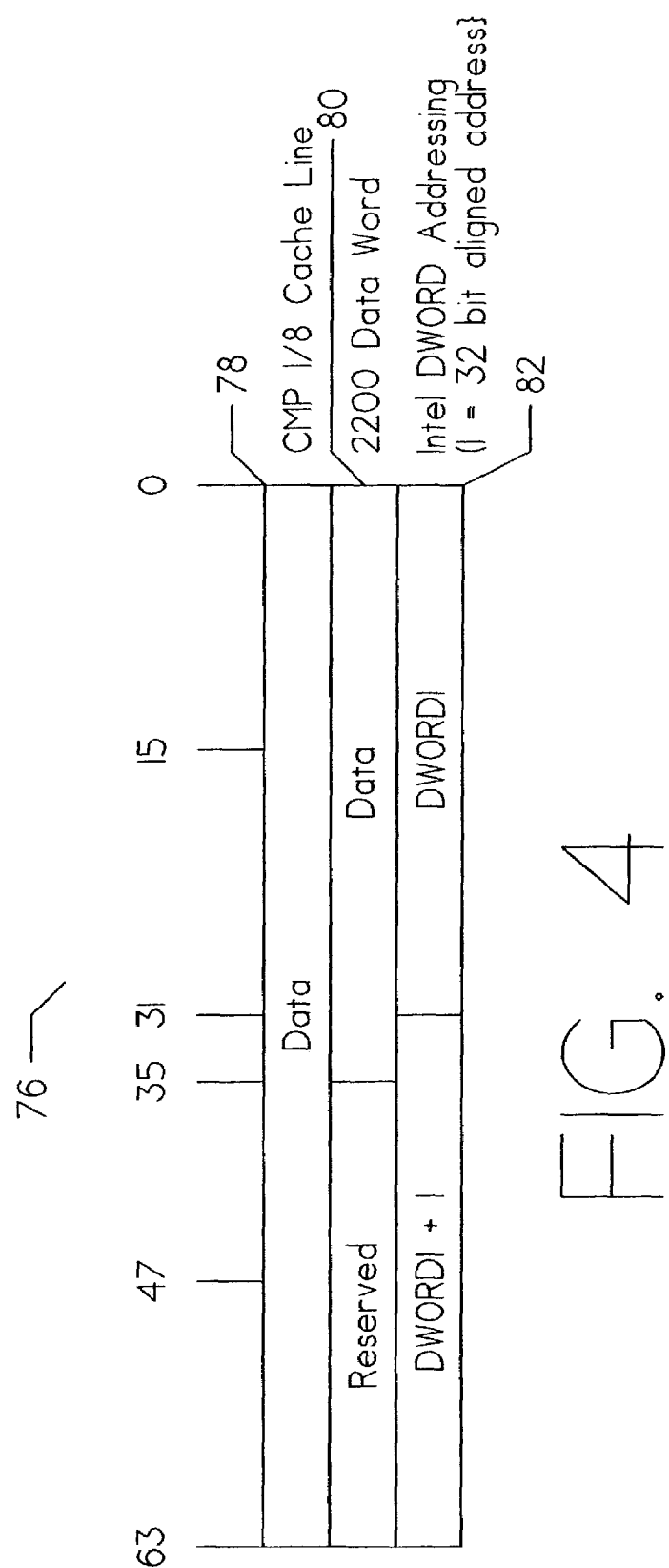
FIG. 4 is a diagram showing the format of data transfers between the cluster processors and the host computer.

FIG. 4 is a detailed diagram 76 showing the format for data conversion between the XPC's (i.e., Primary XPC 50 and Secondary XPC 52) with Host A through Host D. Host A through Host D, being ClearPath Plus (OS 2200 based) mainframes from Unisys Corporation, have a basic 36 bit word internal format, whereas the XPC's are basically byte oriented with 16 bit, 32 bit, and 64 bit words. A 64 bit data word 78 corresponds to a 36 bit 2200 data word 80, and two 32 bit Intel DWORD's 82.

Figure 5:
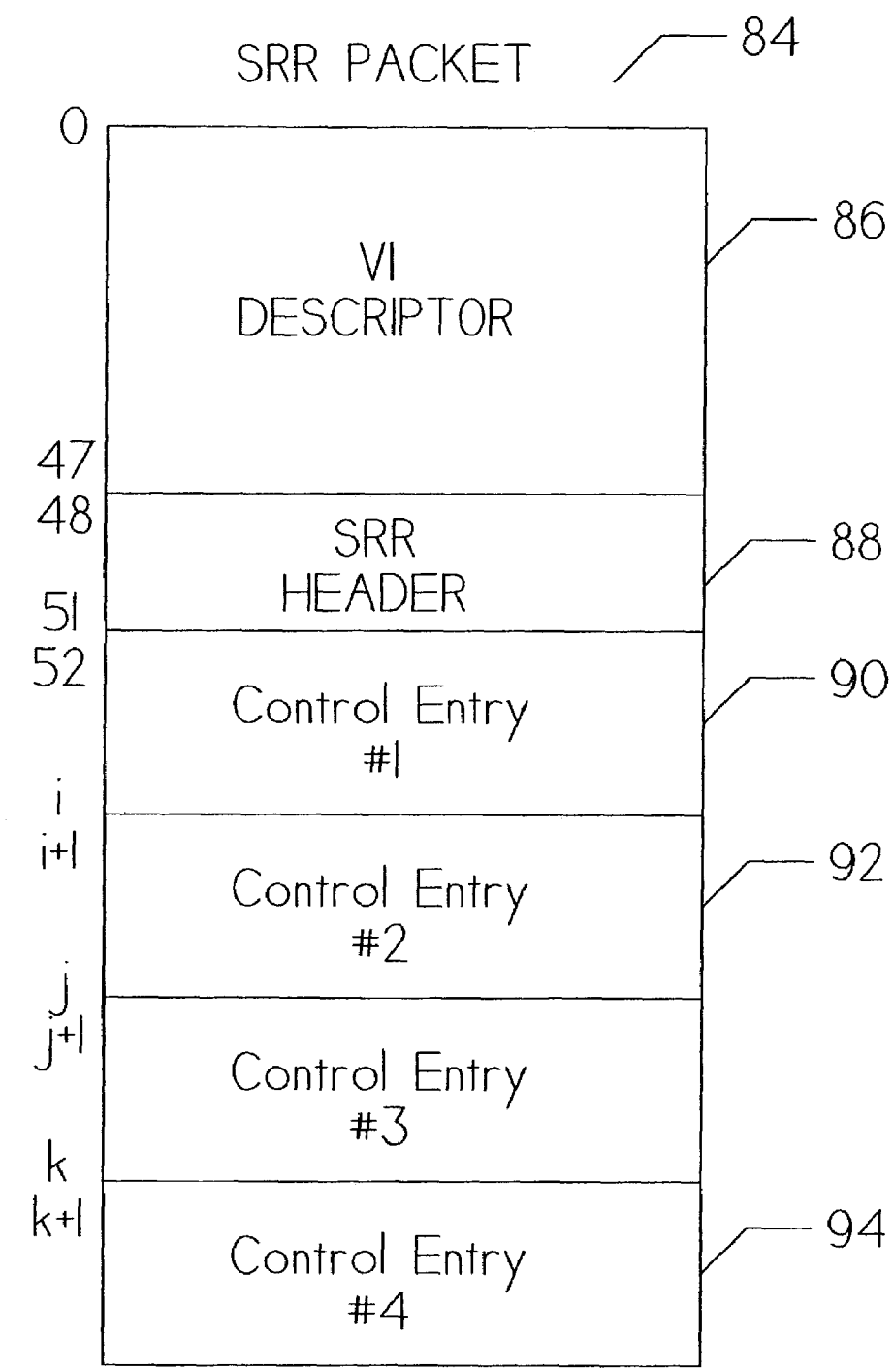
FIG. 5 shows the format of the Synchronization path Request/Response (SRR) packet.

FIG. 5 is a diagram 84 showing the format of a Synchronization path Request/Response (SRR) packet. Though the SRR packets are primarily used to convey audit data from master to slave, they are also used to implement the master/slave control functions. The first 48 words contain Descriptor 86. This is followed by Header 88. A number of control entries (i.e., Control Entry #1 go, Control Entry #2 92, Control Entry #3, and Control Entry #4 94) provide the actual control information. Each of the control entries has a variable length depending upon the function to be performed, as explained below.

Figure 6:
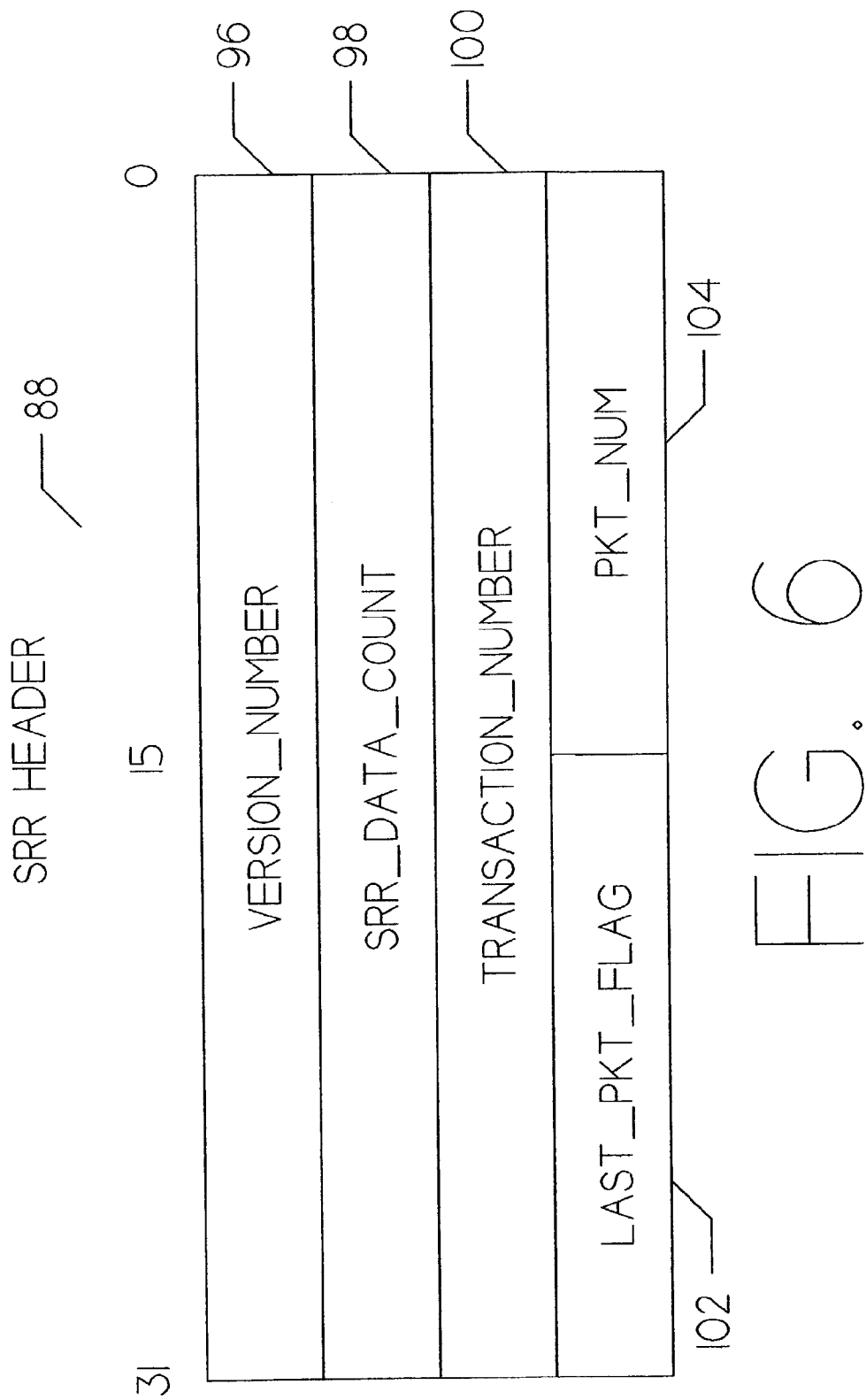
FIG. 6 is diagram showing the format of the SRR packet header.

FIG. 6 is a diagram showing the format of SRR header 88. The first 32 bit word contains version number 96, which describes the version number of the service running on the platform. This is used to determine whether services running on primary/secondary platforms are compatible.

This is followed by SRR data count 98, indicating the number of 32 bit words within the SRR packet, and transaction number 100. The last 32 bit word of the fixed length SRR header 88 contains Last Packet Flag 102, which indicates that the current packet is the last packet of an audit sequence. and Packet Number 104. If Last Packet Flag 102 is set and Packet Number 104 is equal to 1, the current SRR packet is the only packet in the audit sequence.

Figure 7:
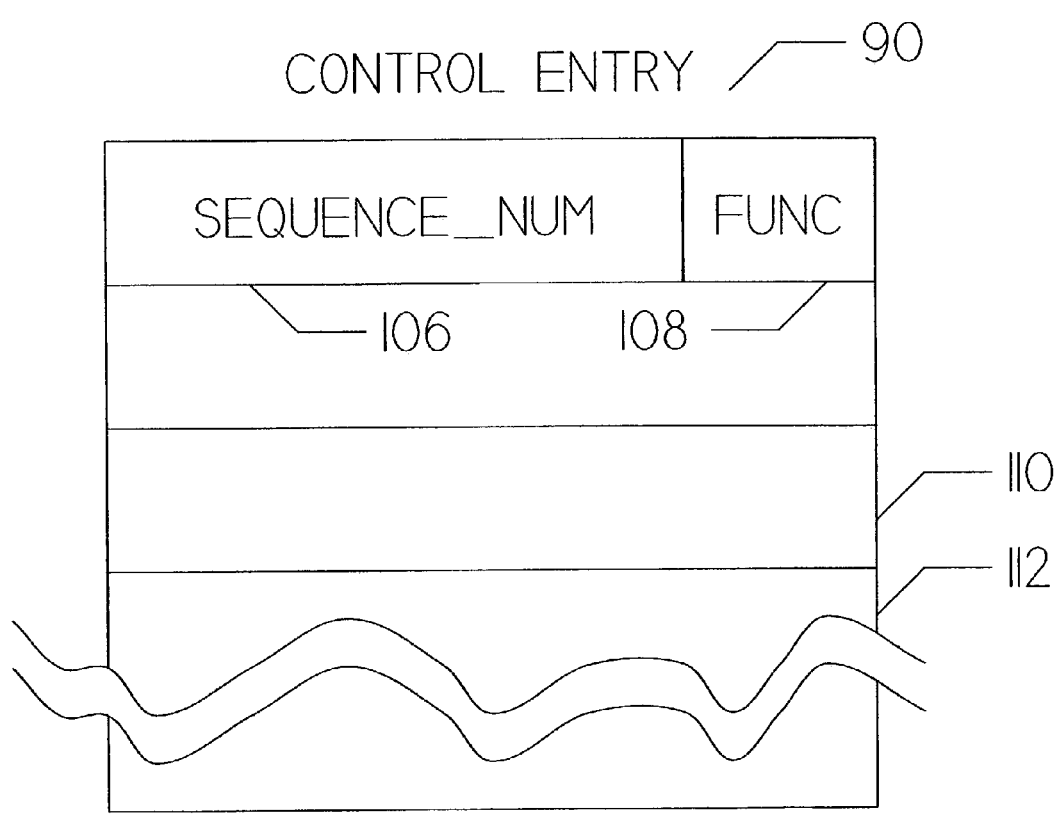
FIG. 7 is a diagram showing the format of a control entry.

FIG. 7 is a diagram showing the format of control entry go. Sequence Number 106 is available to keep track of the specific control entry. Function 108 determines the length of the control entry, because it determines the number of 32 bit words 110–112 required to define the function.

The function code is an 8 bit number which decodes into 256 different numbers. Values 0, 7–16, and 33–255 are defined as invalid. The remaining defined function codes are as follows:

1—Write Audit Data;
2.—Audit Updates Completed;
3.—Resend Audit Data;
4.—Abort Audit Updates;
5.—Audit Request Accepted;
6—Audit Request Rejected;
17—Heartbeat;
18—Probe Path Identification;
19—Path Identification;
20—Query Memory Size;
21—Return Memory Size;
22—Set Memory Size;
23—Transfer Coherent Memory;
24—Coherent Memory Transfer Completed;
25—Up/Down Path;
26—Switch State Pending;
27—Switch Master/Slave State;
28—Commit State Change;
29—Request permission to become active;
30—Terminate Service Request;
31—Positive Acknowledge; and
32—Negative Acknowledge.

FIG. 8 is a table showing allocation of memory as made by the Master CLS.

Figure 9:
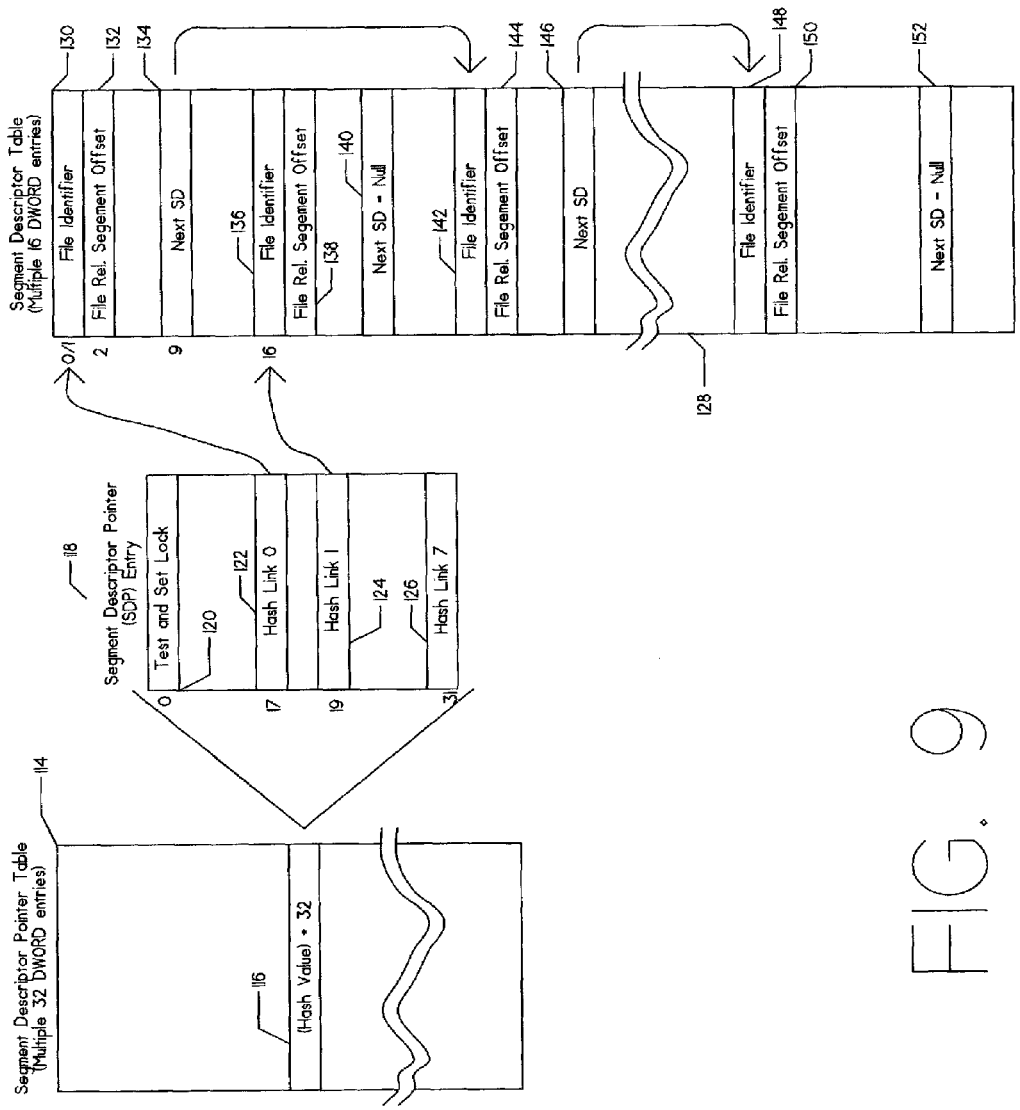
FIG. 9 is a detailed diagram showing operation of the segment descriptor.

FIG. 9 is a detailed diagram showing segment descriptor accessing. Segment Descriptor Pointer Table 114 consists of up to 1024—32-bit unsigned integer entries. Example 116 is an entry having hash value=32 which points to Segment Descriptor Pointer (SCP) entry 118.

Segment Descriptor Pointer 118 consists of 32 words of 32 bits each. The first word is the test and set lock which is used to control access to the segment descriptors that hash to this entry. The remaining words point to up to eight entries within the Segment Descriptor Table, consisting of 1,024—32-bit unsigned integers. Word 17 of Segment Descriptor Pointer Entry 116 is hash link 0 (122), word 19 is hash link 1 (124), and word 31 is hash link 7 (126).

The file name associated with hash link 0 is File Identifier 130 occupying the first two words of the Segment Descriptor Table. The corresponding File Relative Segment Offset 132 is located in the next word. Word 9 is Next Segment Descriptor 134 which points to the next associated segment (i.e., File Identifier 142) as shown.

Similarly, the file name associated with hash link 1 (124) is File Identifier 136. File Relative Segment Offset 138 provides the corresponding relative offset. Because there are no further associated segment descriptors, Next Segment Descriptor 140 is null.

File Relative Segment Offset 144 corresponds to File Identifier 142. Associated therewith is Next Segment Descriptor 146 which points to File Identifier 148, located subsequent to extended area 128. File Relative Segment Offset 150 corresponds thereto. There are no further associated segment descriptors so Next Segment Descriptor 152 is null.

Figure 10:
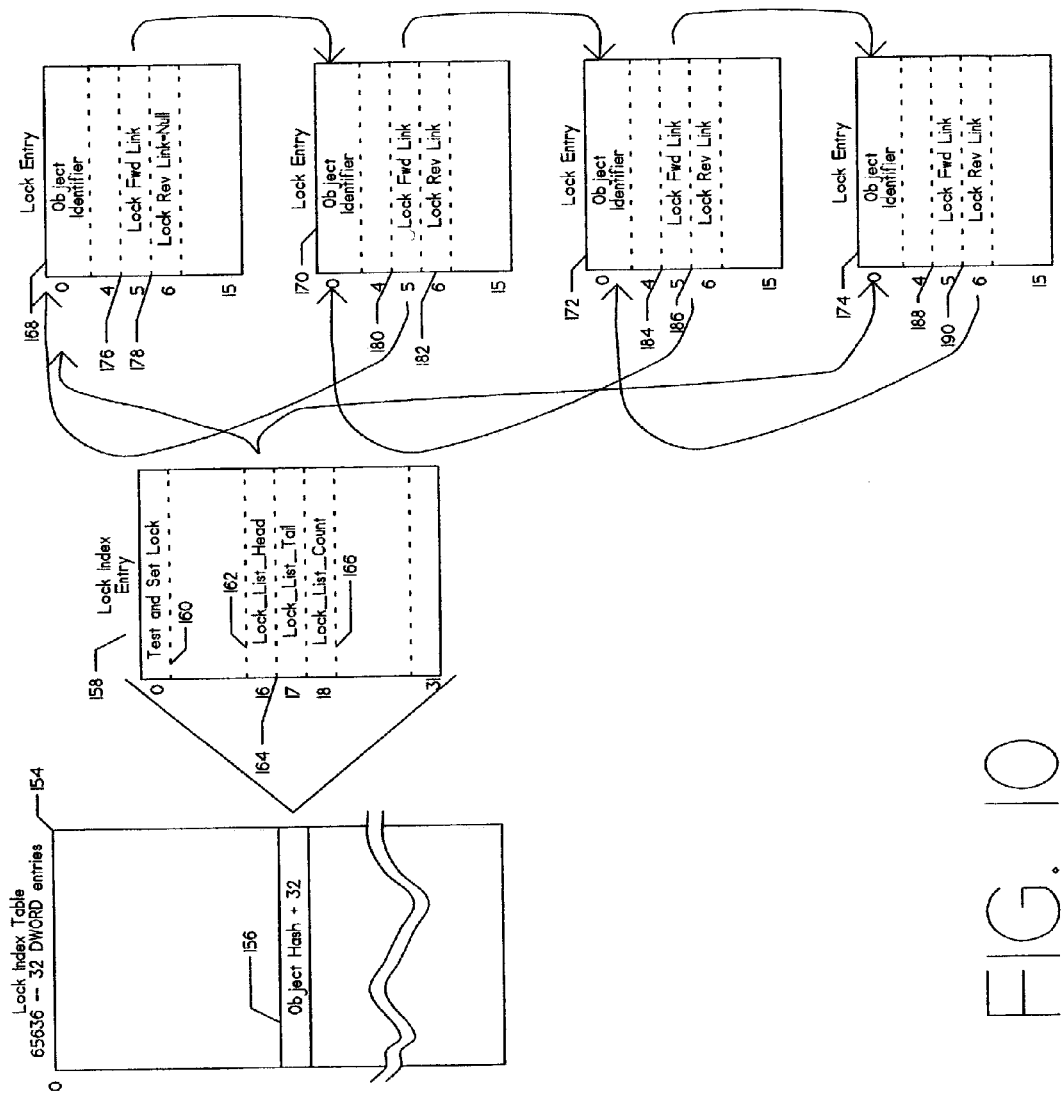
FIG. 10 is a detailed diagram showing operation of the locks.

FIG. 10 is a detailed flow diagram showing lock entry accessing. It is via this locking system that the Cluster Lock Servers (see also FIG. 1) maintain control of the shared memory facilities. Lock Index Table consists of 65,636—32-bit unsigned integer entries. Example 156 is Object Hast +32 which points to Lock Index Entry 158.

Test and Set Lock 160 occupies the first word of Lock Index Entry 158. It is used to control access to this lock list. Lock_List_Head 162 provides the address of the first lock entry that hashes to this location. Lock_List_Tail 164 supplies the address of the last lock entry that hashes to his location. Lock_List_Count 166 specifies the number of lock entries on this lock list.

Object Identifier 168, 170, 172, and 174, name the actual lock entries for this particular lock list. Lock Forward Links 176, 180, 184, and 188 address the next lock entry in this lock list. Lock Reverse Links 178, 182, 186, and 190 supply the address of the previous lock entry in this lock list. Because it is associated with the first lock entry in the lock list, Lock Reverse Link 178 is Null.

Figure 11:
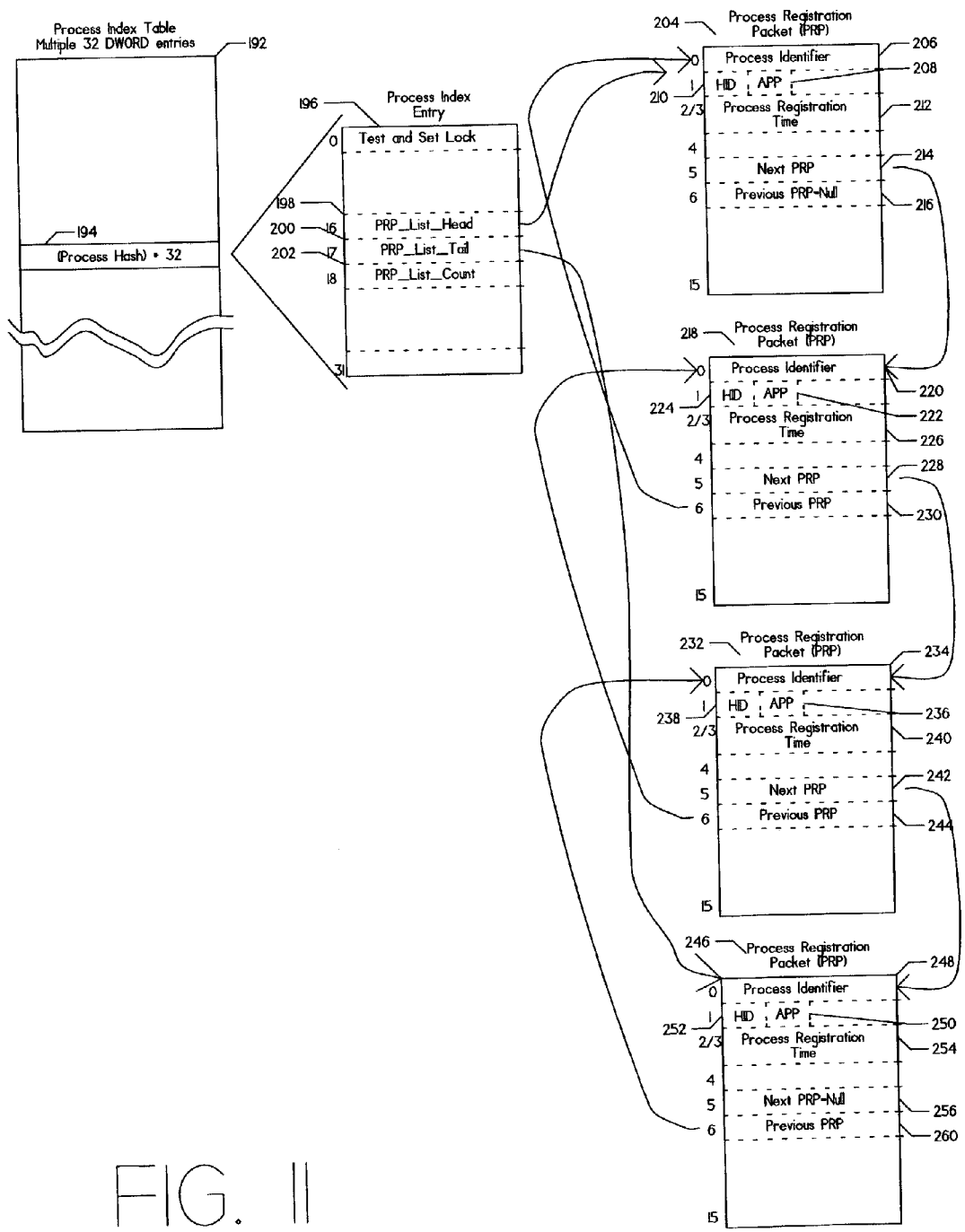
FIG. 11 is a detailed diagram showing operation of process registration.

FIG. 11 is a detailed flow diagram of Process Entry Accessing in accordance with the preferred mode of the present invention. Process Index Table 192 consists of 4,096—32-bit unsigned integer entries. Sample entry 194 contains process hash +32 which identifies the Process Index Entry shown.

Test and Set Lock 196 is used to control access to this process list. PRP_List_Head 198 address the first Process Registration Packet 204 that hashes to this location. PRP_List_Tail 200 supplies the address of the last Process Registration Packet that hashes to this location. PRP_List_Count 202 provides the number of Process Registration Packets on this process list.

Process Registration Packets (PRP) 204, 218, 232, and 246, each consist of 16—32-bit unsigned integers. The first word is Process Identifier 206, 220, 234, and 248, respectively. The second word contains Host Identifier 210, 224, 238, and 252 and Application Identifier 208, 222, 236, and 250, each of which define processing for the corresponding cluster instruction processor.

Process Registration time 212, 226, 240, and 254 is maintained because the Windows operating system employed within the individual cluster instruction processors has insufficient resolution for the system of the present invention. Part of the time is derived from system time and part from a code-maintained counter, which is sized to assure overall registration time uniqueness.

Next PRP 214, 228, 242, and 256 point to the next Process Registration Packet within the list. Similarly, Previous PRP 216, 230, 244, and 260 each point to the next previous PRP packet. Because PRP Packet 204 is the first packet in the list, Previous PRP is set to null.

Figure 12:
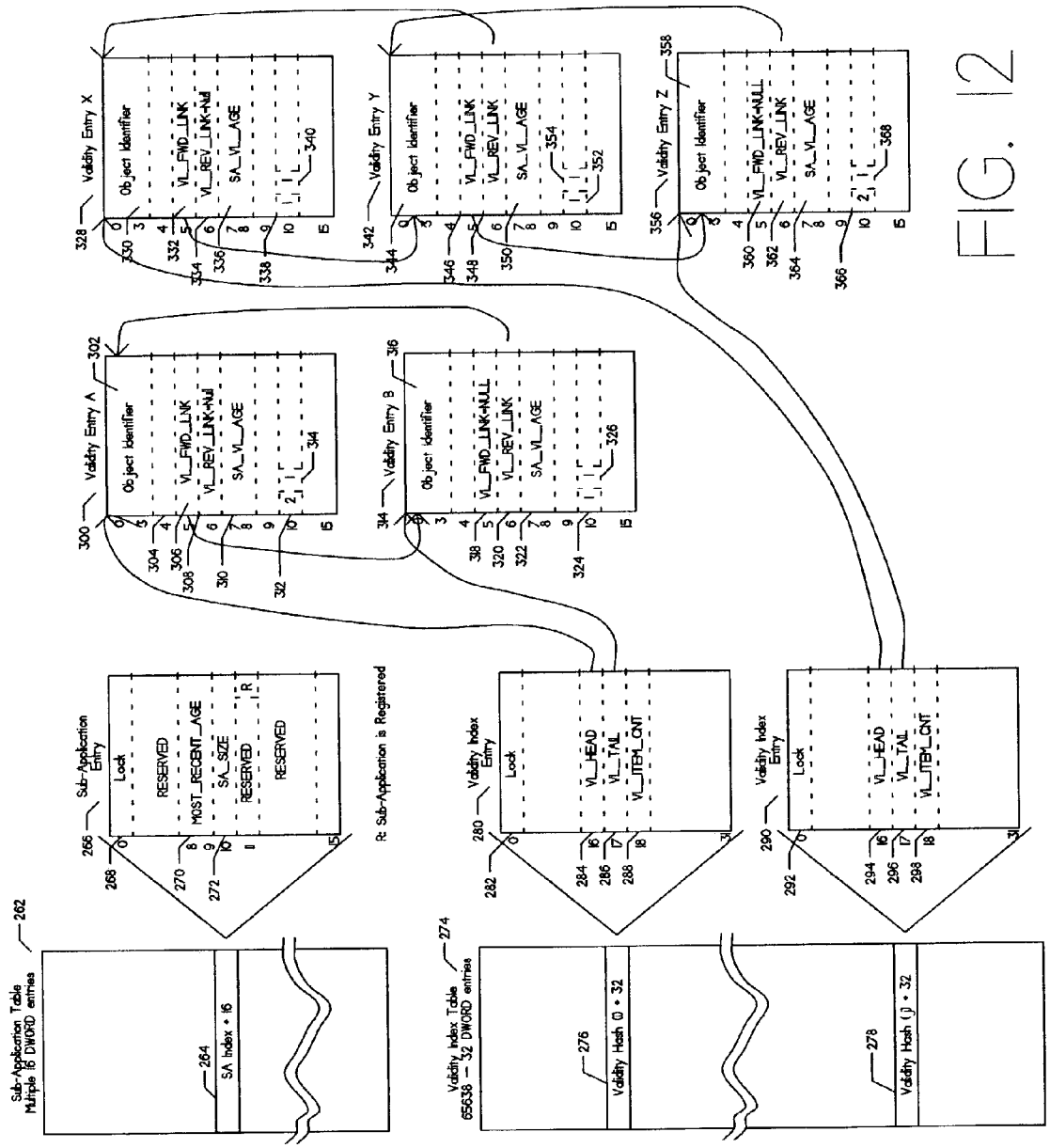
FIG. 12 is a detailed diagram showing operation of sub-application assignments.

FIG. 12 is a detailed view of the Inter-Host Cache (IHC) data structures. Two validity lists are shown in the example, with validity entries for sub-applications 1:1 and 2:1. The sub-application entry is shown for sub-application 1:1, and contains the Most_Recent_Age of validity entries for sub-application 1:1. The Most_Recent_Age is used in conjunction with the sub-application size (SA_SIZE) to implement a MRU/LRU algorithm used to determine if the validity object is within the sub-application cache. Validity list entries which are outside of the LRU limit are removed whenever a validity operation encounters an 'old' entry. This is accomplished via a scan of the entire validity list after status is returned to the host.

In the example, validity list 'i' contains two entries (A and B), one each for sub-application 1:1 and 2:1. Validity list 'j' contains three entries (X, Y and Z), two for sub-application 1:1 and one for sub-application 2:1. The sub-application entry is shown for sub-application 1:1, having a Most_Recent_Age of 683 and SA_Size of 100, yielding a "validity age" range of 584–683. The validity entries in validity list 'j' (entries X and Y) are both within the range and are therefore within the sub-application cache. However, the validity entry B in validity list 'i' for sub-application cache. However, the validity entry B in validity list 'i' for sub-application 1:1 is not within the range, and is therefore not with in the sub-application cache. The next IHC operation that references validity list 'i' will find and remove the 'aged out' entry.

Sub-Application Table 262 contains 1,684—32-bit unsigned integer entries. Entry 254 contains a Sub-Application Index +16 which points to Sub-Application Entry 266. The first word is Test and Set Lock 268 which controls access to the sub-application entry. MOST_RECENT_AGE 270 is the counter value for the most recently accessed validity entry in this sub-application. After its initial value of zero, the only operations allowed on this field are increments. SA_SIZE 272 is the number of validity entries for this sub-application. This is the value as seen by the hosts and not the actual number of validity entries that are on the validity lists.

Validity Index Table 274 contains 65,638—32-bit unsigned integer entries. A first sample entry 276 contains Validity Hash (i+32) which points to Validity Index Entry 280. A second sample entry 278 contains Validity Hash (j+32) which points to Validity Index Entry 290.

Validity Index Entry 280 has a Test and Set Lock 282 which is used to control access to this validity list. VL_HEAD 284 supplies the address of the first validity entry (i.e., Validity Entry A 300) that hashes to his location. Similarly, VL_TAIL 286 contains the address of the last validity entry (i.e., Validity Entry B 314) that hashes to this location. VL_ITEM_CNT 288 specifies the number of validity entries on this validity list.

Validity Index Entry 290 has a Test and Set Lock 292 which is used to control access to this validity list. VL_HEAD 294 supplies the address of the first validity entry (i.e., Validity Entry X 328) that hashes to his location. Similarly, VL_TAIL 296 contains the address of the last validity entry (i.e., Validity Entry Z 356) that hashes to this location. VL_ITEM_CNT 298 specifies the number of validity entries on this validity list.

Each of Validity Entries A 300, B 314, X 328, Y 342, and Z 356 an Object Identifier (i.e., 302, 316, 330, 344, and 358); a forward link (i.e., VL_FWD_LINK 306, 318, 332, 346, and 360); a reverse link, (i.e., VL_REV_LINK 308, 320, 334, 348, and 362); and an age (i.e., SA_VL_AGE 310, 322, 336, 350, and 364).

Figure 13:
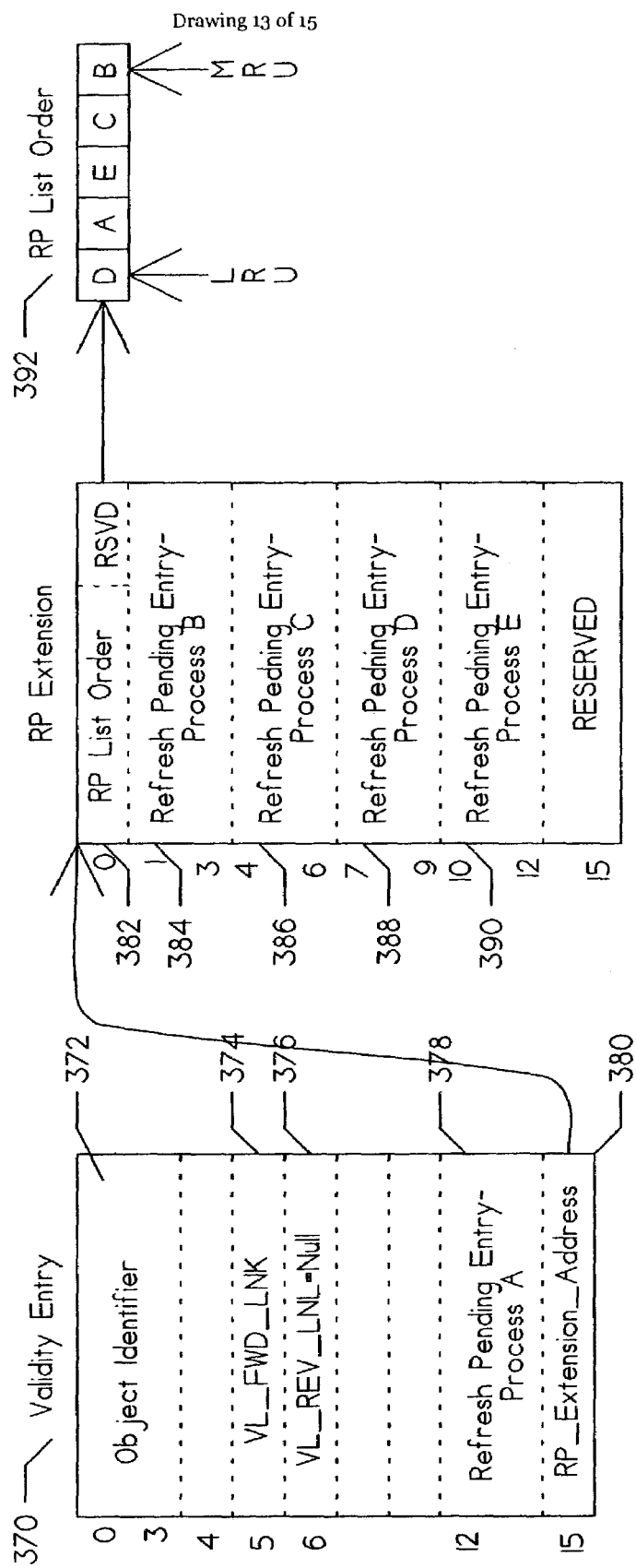
FIG. 13 is a detailed diagram showing operation of the validity entries.

FIG. 13 is detailed diagram showing the format of Validity Entry 370 with Refresh Pending Extension. Validity Entry 370 contains VL_FWD_LINK 374 and VL_REV_LINK 376, as previously discussed. In this example, the validity entry (i.e., Validity Entry 370) is shown with five processes within the same sub-application in 'refresh pending' state. Refresh Pending Entry-Process A 378 shows that Process A was the first initiated. The order of the processes in the RP Extension entries (i.e., entries 384, 386, 388, and 390) indicates that the processes initially referenced the validity entry in the order of A-B-C-D-E. However, subsequent references to the same validity entry occurred in a different order. The 'RP List Order' 382 maintains an LRU/MRU list of the current processes in the Refresh Pending entries. In the example shown at detail 392, process B referenced the validity entry most recently, whereas process D referenced the validity entry least recently (i.e., or oldest reference). The RP Extension is addressed by RP_Extension_Address 380.

Figure 14:
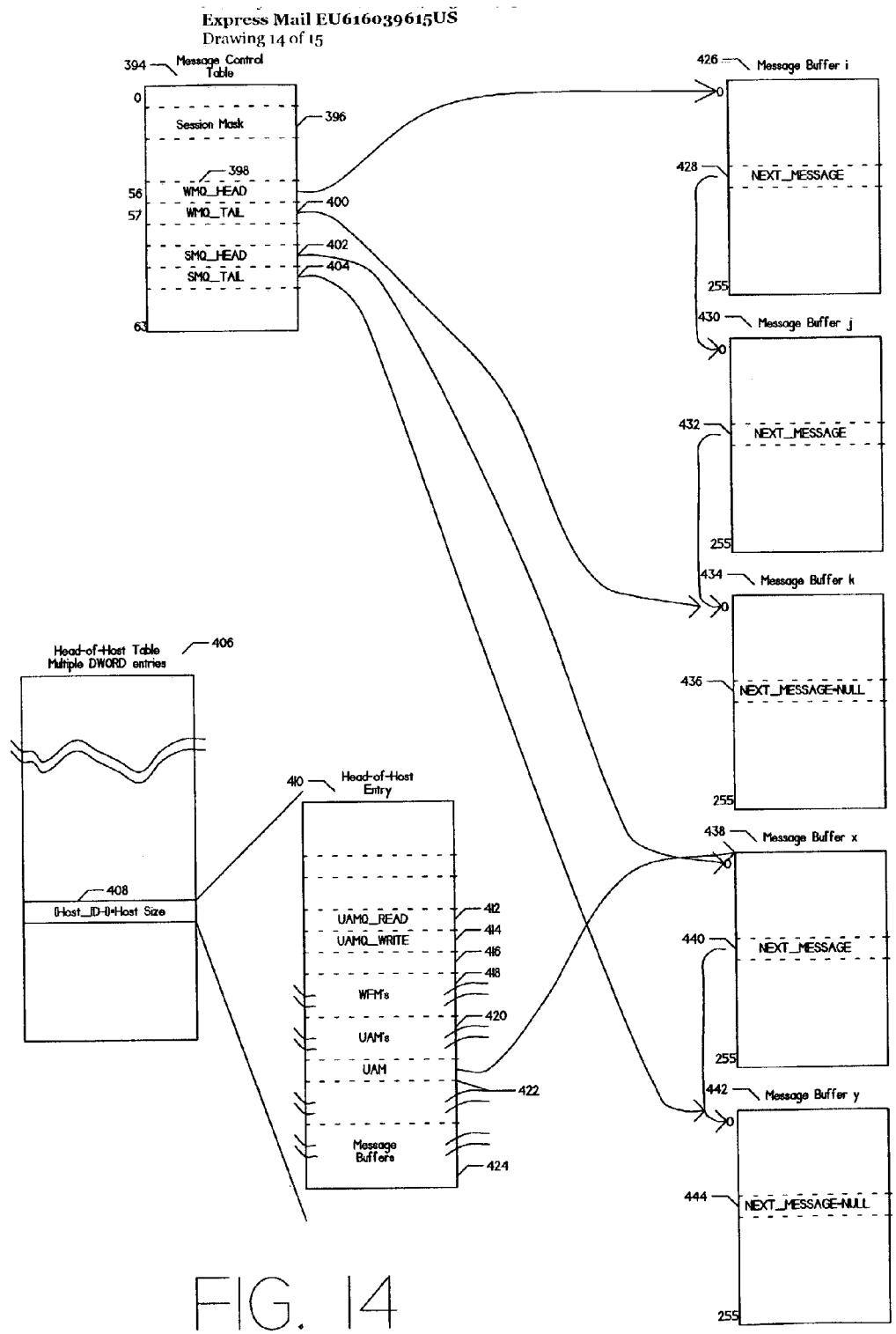
FIG. 14 is a detailed diagram showing message handling.

FIG. 14 is a detailed diagram showing messaging implementation. In the example shown, messages (represented by message buffers i 426, j 430, and k 434) reside on the 'waiting message queue' (WMQ), waiting for a wait-for-message (WFM) from each addressed host. Message Control Table 394 points to Message Buffer i 426 via WMQ_HEAD 398 and to Message Buffer k 434 via WMQ_TAIL 400. The three message buffers are internally linked via NEXT_MESSAGE 428 and 432. Messages (represented by Message Buffers x 438 and y 442) have been sent to the host(s) but have not yet been acknowledged, and both are members of the 'sent message queue' (SMQ). SMQ_HEAD 402 points to Message Buffer x 438 and SMQ_TAIL 404 points to Message Buffer y 442.

Message Buffer 'x' 438 belongs to the host corresponding to the shown head-of-host (HOH) entry, and Message Buffer 'y' 442 belongs to some other host. NEXT_MESSAGE 440 links the two message buffers in the sent message queue.

The message buffers are shown as separate entries for purposes of clarity and are derived from the Message Buffers in the Head-of-Host entries. The collection of Message Buffers in a HOH entry 410 are known as a Host Message Buffer Queue (HMBQ). In the example shown, Message Buffer 'x' 438 resides within the Message Buffers 422 of the shown HOH entry 410. A Head-of-Host Table (HOHT) 406 contains an entry for each of the 64 possible hosts, each table entry contains an array of active Wait-For-Message commands (WFMs), an array of Unacknowledged Messages (UAMs), and an array of message buffers. The Message Control Table (MCT) contains the addresses of the global data structures and test-and-set lock structures required by IHM (inter-host message).

Figure 15:
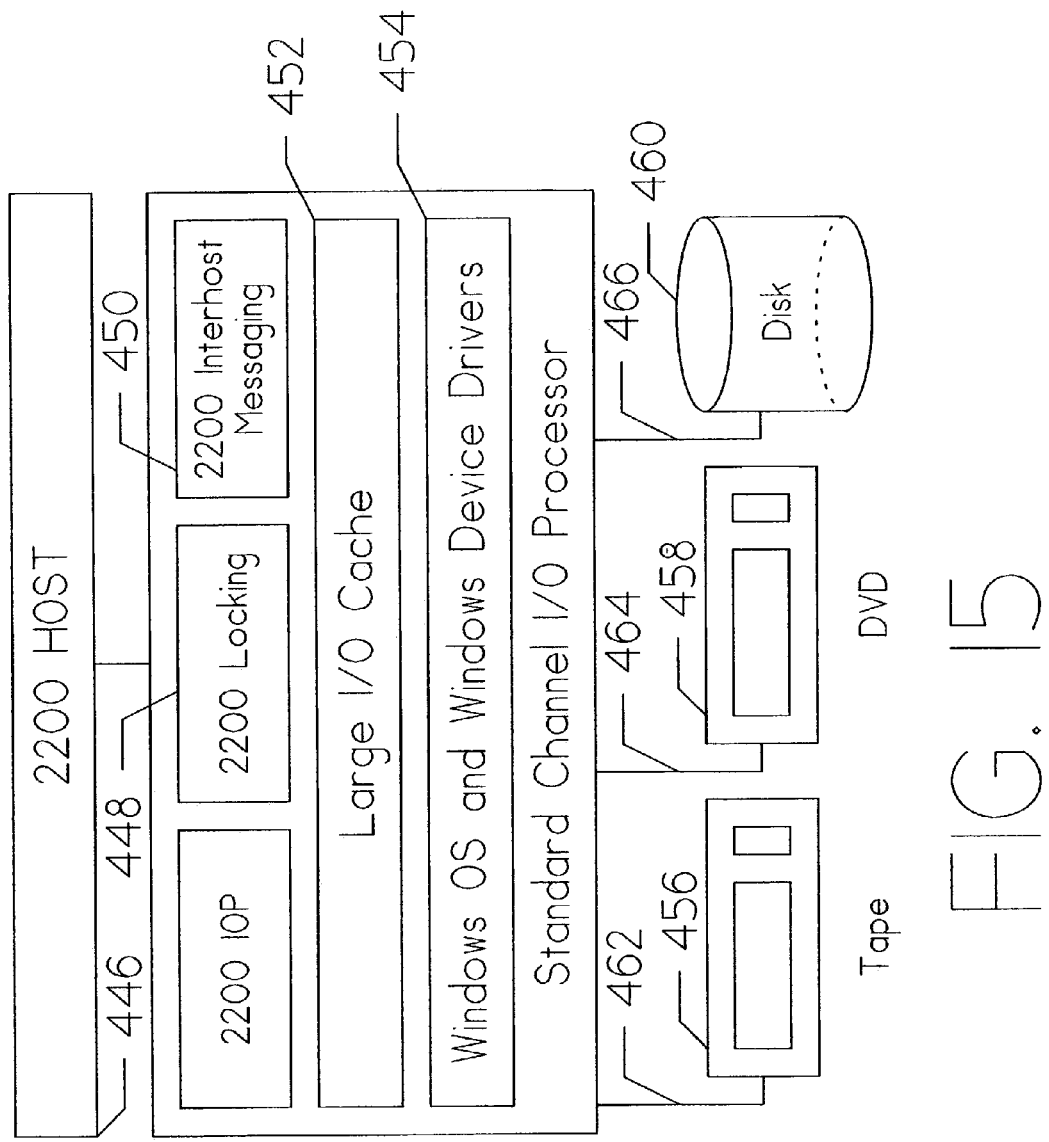
FIG. 15 is a detailed diagram showing integration of the various functions into a single platform.

FIG. 15 is a detailed diagram showing integration of the cluster/locking, caching, and mass storage accessing functions into a single platform. In the actual hardware, the OS 2200 host 446 communicates directly with the single platform incorporating the 2200 IOP 446, 2200 Locking 448, and 2200 Interhost Messaging 450 functionality as shown.

Also included within the same single platform is Large I/O Cache 452, Windows Operating system and Device Drivers 454, and the Standard Channel I/O Processor as shown. The present invention incorporates each of these elements into a single platform. Therefore, communication with Tape 456, DVD 458, and Disk 460, via paths 462, 464, and 466, respectively, is accomplished within the same hardware entity as is interfaced directly with OS 2200 Host 446.

Having thus described the preferred embodiments of the present invention, those of skill in the art will be readily able to adapt the teachings found herein to yet other embodiments within the scope of the claims hereto attached.

We claim:

1. In a data processing system, an improvement comprising:
   a. a plurality of commodity cluster instruction processors;
   b. a master cluster lock server responsively coupled to each of said plurality of commodity cluster instruction processors having an internal cache memory and an Input/Output processor;
   c. wherein a first computer program is assigned for execution by a first selected one of said plurality of commodity cluster instruction processors; and
   d. wherein said data processing system recovers from a failure of said selected one of said plurality of commodity cluster instruction processors by re-assigning said first computer program to a second selected one of said plurality of commodity cluster instruction processors for completion of execution of said first computer program.

2. The improvement according to claim 1 wherein each of said master cluster lock server further comprises Windows operating system.

3. The improvement according to claim 2 further comprising a slave cluster lock server responsively coupled to said master cluster lock server and to each of said plurality of commodity cluster instruction processors.

4. The improvement according to claim 3 further comprising a first host computer responsively coupled to said master cluster lock server and said slave cluster lock server.

5. The improvement according to claim 4 further comprising a second host computer responsively coupled to said master cluster lock server and said slave cluster lock server.

6. An apparatus comprising:
   a. a plurality of commodity cluster instruction processors;
   b. a master cluster lock server responsively coupled to each of said plurality of commodity cluster instruction processors having an internal cache memory and Input/Output processor;
   c. wherein a first computer program is assigned for execution by a first selected one of said plurality of commodity cluster instruction processors; and
   d. wherein recovery from a failure of said selected one of said plurality of commodity cluster instruction processors is accomplished by re-assigning said first computer program to a second selected one of said plurality of commodity cluster instruction processors for completion of execution of said first computer program.

7. The apparatus of claim 6 further comprising a slave cluster lock server responsively coupled to each of said plurality of commodity cluster instruction processors and to said master cluster lock server.

8. The apparatus of claim 7 wherein each of said master cluster lock server and said slave cluster lock server further comprise Windows operating system.

9. The apparatus of claim 8 further comprising a first host computer responsively coupled to said master cluster lock server.

10. The apparatus of claim 9 further comprising a second host computer responsively coupled to said master cluster lock server.

11. A method of executing a computer program comprising:
   a. accessing a first computer program with a cluster lock server via an internal cache memory directly from mass storage;
   b. preparing said first computer program for assignment by said cluster lock server to a selected one of a plurality of commodity cluster instruction processors;
   c. assigning said first computer program for execution by said selected one of said plurality of commodity cluster instruction processors;
   d. protecting said first computer program from interference by said unselected ones of said plurality of commodity cluster instruction processors; and
   e. recovering from a failure of said selected one of said plurality of commodity cluster instruction processors by assigning said first computer program to a second selected one of said plurality of commodity cluster instruction processors for completion of execution.

12. The method according to claim 11 further comprising:
   a. accessing a second computer program with said cluster lock server; and
   b. assigning said second computer program for execution to a second selected one of said plurality of commodity cluster instruction processors by said cluster lock server.

13. The method according to claim 12 wherein a second cluster lock server assumes the functions of said cluster lock server upon failure of said cluster lock server.

14. An apparatus comprising:
   a. describing means for describing a computer program in computer language including a plurality of computer programs;
   b. a plurality of commodity cluster instruction processors;
   c. managing means responsively coupled to each of said plurality of commodity cluster instruction processors for managing said plurality of commodity cluster instruction processors having an internal cache memory and an Input/Output processor;
   d. permitting means responsively coupled to said managing means for permitting said managing means to assign said describing means to a selected one of said plurality of commodity cluster instruction processors for execution;
   e. wherein a first of said plurality of computer programs is assigned for execution by a first selected one of said plurality of commodity cluster instruction processors; and
   f. wherein recovery from a failure of said selected one of said plurality of commodity cluster instruction processors is accomplished by re-assigning said first computer program to a second selected one of said plurality of commodity cluster instruction processors for completion of execution of said first computer program.

15. The apparatus according to claim 14 wherein each of said managing means operates under Windows operating system.

16. The apparatus according to claim 15 further comprising second means for managing responsively coupled to each of said plurality of commodity cluster instruction processors.

17. The apparatus according to claim 16 further comprising a first host computer responsively coupled to said managing means.

18. The apparatus according to claim 17 further comprising a second host computer responsively coupled to said managing means.

* * * * *